(12) United States Patent
Chen et al.

(10) Patent No.: US 10,290,146 B2
(45) Date of Patent: May 14, 2019

(54) DISPLAYING DEPTH EFFECTS IN DIGITAL ARTWORK BASED ON MOVEMENT OF A DISPLAY

(71) Applicant: ADOBE INC., San Jose, CA (US)

(72) Inventors: Zhili Chen, San Jose, CA (US); Xin Sun, Santa Clara, CA (US); Nathan Carr, San Jose, CA (US)

(73) Assignee: Adobe Inc., San Jose, CA (US)

( * ) Notice: Subject to any disclaimer, the term of this patent is extended or adjusted under 35 U.S.C. 154(b) by 119 days.

(21) Appl. No.: 15/335,069

(22) Filed: Oct. 26, 2016

(65) Prior Publication Data

US 2018/0114358 A1    Apr. 26, 2018

(51) Int. Cl.
| | | |
|---|---|---|
| *G06T 15/20* | (2011.01) | |
| *G06T 15/50* | (2011.01) | |
| *G06T 15/60* | (2006.01) | |

(52) U.S. Cl.
CPC ............ *G06T 15/20* (2013.01); *G06T 15/506* (2013.01); *G06T 15/60* (2013.01)

(58) Field of Classification Search
CPC ................ G06F 2200/1614; G06F 2200/1637
See application file for complete search history.

(56) References Cited

U.S. PATENT DOCUMENTS

| | | | |
|---|---|---|---|
| 8,379,021 B1* | 2/2013 | Miller ..................... | G06T 15/60 345/426 |
| 9,437,038 B1* | 9/2016 | Costello ................. | G06T 15/08 |
| 2007/0273686 A1* | 11/2007 | Watanabe ............. | G06T 15/506 345/419 |
| 2011/0248987 A1* | 10/2011 | Mitchell ................. | G06T 15/20 345/419 |
| 2013/0127838 A1* | 5/2013 | Derrig ..................... | G06T 15/00 345/419 |

OTHER PUBLICATIONS

Blatner, Anthony M. TangiPaint: Interactive tangible media. Rochester Institute of Technology, 2011.*
Welsh, Terry. "Parallax mapping with offset limiting: A perpixel approximation of uneven surfaces." Infiscape Corporation(2004): 1-9. (Year: 2004).*

* cited by examiner

*Primary Examiner* — Daniel F Hajnik
(74) *Attorney, Agent, or Firm* — Brake Hughes Bellermann LLP (57) ABSTRACT

Techniques disclosed herein display depth effects in digital artwork based on movement of a display. In one technique, a first rendering of the digital artwork is displayed on the display. While the first rendering is displayed, a movement of the display is determined based on motion information from a motion sensor associated with the display. Based on the movement of the display, a position of the digital artwork is determined relative to a fixed gaze direction and a fixed light direction in a 3 dimensional (3D) model. A second rendering of the digital artwork is displayed on the display on the artwork. Displaying the second rendering involves displaying a depth effect based on variable depth of the digital artwork and the position of the digital artwork relative to the fixed gaze direction and the fixed light direction in the 3D model.

20 Claims, 8 Drawing Sheets

501
Display a first rendering of the digital artwork on the display

502
Determine a movement of the display based on motion information from a motion sensor attached to or within the display

503
Determine a second position of the digital artwork relative to a fixed gaze direction and a fixed light direction in a 3D model

504
Display a second rendering of the digital artwork on the display including a depth effect based on variable depth of the digital artwork and the second position of the digital artwork

DISPLAYING DEPTH EFFECTS IN DIGITAL ARTWORK BASED ON MOVEMENT OF A DISPLAY

TECHNICAL FIELD

This disclosure relates generally to computer-implemented techniques and more particularly relates to improving the efficiency and effectiveness of computing systems used to display digital artwork.

BACKGROUND

Variations in paint thickness in a painting often enhance the painting's appearance. For example, paint thickness is an important aspect of impasto paintings. Impasto is a technique where paint is laid very thickly in places to provide intriguing visual effects. Impasto paintings often show the shape of brushes and strokes, interleaving between paint and canvas fiber, and the layered mixture of paint colors. Techniques used to render impasto paintings on computing devices generally provide an inadequate, unrealistic, and unintuitive viewer experience. Two dimensional (2D) representations appear flat and do not allow the user to appreciate the thickness variations in the paintings. Attempts to instead represent impasto paintings using three dimensional (3D) shapes also do not provide an adequate user experience. With real artwork, the user can change his viewing position or rotate the artwork to observer shadow and other effects caused by the depth variations to get a spatial appreciation of the depth variations in the painting. In contrast, computer renderings of 3D shapes representing impasto paintings are presented in virtual 3D environments that are complicated and cumbersome to manipulate. Such an environment can include a 3D model in which the artwork is displayed, and a light source is defined, and a viewer position is defined. To change his viewing perspective, the user must manually interact with the 3D model using a computer input devices such as a mouse, pen, or trackpad to specify a new position for the artwork or viewer position. This is cumbersome, difficult, and not intuitive for many users. As a result, the user does not have the same real-world, intuitive experience of moving or rotating the artwork to change his or her viewing perspective to appreciate the artwork's depth.

SUMMARY

Techniques disclosed herein display depth effects in digital artwork based on movement of a display. In one technique, a first rendering of the digital artwork is displayed on the display. While the first rendering is displayed, a movement of the display is determined based on motion information from a motion sensor associated with the display. For example, the motion sensor can detect when the user rotates, tilts, or moves the display to one side. Based on the movement of the display, a second position of the digital artwork is determined relative to a fixed gaze direction and a fixed light direction in a 3 dimensional (3D) model. A second rendering of the digital artwork is displayed on the display on the artwork. Displaying the second rendering involves displaying a depth effect based on variable depth of the digital artwork and the second position of the digital artwork relative to the fixed gaze direction and the fixed light direction in the 3D model. For example, displaying the depth effect can involve displaying shadow occlusions by displaying shadows where deeper portions of the digital artwork block light to thinner portions on a surface of the digital artwork in the 3D model. In this way, a user is able to move the digital artwork in an intuitive way, i.e., by moving the display, to observe depth variations in the digital artwork.

Renderings of the digital artwork can be provided on-the-fly during a movement of the display according to certain techniques of the invention. This involves determining different positions of the digital artwork relative to the fixed gaze direction and the fixed light direction in the 3D model based on the movement of the display. During the movement, a sequence of renderings of the digital artwork is displayed with different depth effects based on the different positions of the digital artwork.

Certain techniques of the invention additionally or alternatively enhance the realism of the user interaction with the digital artwork by displaying the digital artwork in a fixed alignment with the display surface during the movement. For example, renderings of an impasto painting can be aligned parallel with the surface of display. As the user moves the display, the impasto painting appears to move with the display as if the painting were on the surface of the display. The displayed depth effects in the renderings give the impression of viewing the artwork from different perspectives as the user moves the display.

These illustrative features are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

As discussed above, existing techniques used to render variable-depth artwork on computing devices generally provide an inadequate, unrealistic, and unintuitive viewer experience. The invention enables a user to rotate or otherwise move a display to reposition the digital artwork, in the same ways the user would reposition real artwork to appreciate depth variations in the artwork. As the display is moved, for example, when the display is tipped back, the appearance of the digital artwork is changed to simulate what the user would see when moving real artwork in the same way. For example, as the user tips the display back, the shadows caused by the different depths within the digital artwork change. Similarly, as the user tips the display back, the positions of certain parts of the artwork are offset (i.e., using parallax offsets) to provide a realistic impression of the variable depths in the artwork.

The techniques of the invention enable new ways of interacting with digital impasto paintings and other variable-depth digital artwork to appreciate depth variations. To provide the impression that the user can move the artwork by moving the device, the digital artwork remains aligned with the display. For example, the canvas of an impasto painting can remain parallel to the front of the display as the display is moved. As the user moves the display to move the digital artwork, the appearance of the digital artwork changes to show depth effects that simulate what the user would see when moving real artwork in the same way.

The changes to the appearance of digital artwork that show depth effects are accomplished by providing different renderings of a 3 dimensional (3D) model of the digital artwork from different viewer perspectives. The 3D model is based on a world space (i.e., a coordinate system based on the real world in which the display is positioned and re-positioned). The 3D model of the digital artwork can be created by capturing a 3D image of real artwork, for example, using a 3D camera, 3D scanner, or other technique that captures the appearance and depth of a real object. Alternatively, the 3D model can be created on the computing device, for example, using a content creation tool in which a content author specifies the appearance and depth characteristics of the 3D model.

Different renderings of the digital artwork in the 3D model are used to show depth effects. Each of these different renderings is determined based on the digital artwork being positioned differently relative to a fixed gaze direction and a fixed light direction in the 3D model. For example, given a light direction from above in the 3D model, a first rendering can show a 2D image of the digital artwork in the 3D model that shows how the digital artwork appears when viewed from the left side. This first rendering thus shows how the digital artwork would appear if a viewer had rotated the digital artwork to the right to view it from the left side. A second rendering can show a different 2D image of the 3D model that shows how the 3D model appears when viewed from the right side. This second rendering thus shows how the digital artwork would appear if the viewer had rotated the digital artwork to the right to view it from the right side. A third rendering can show a different 2D image of the digital artwork in the 3D model that shows how the digital artwork appears when viewed tilted back. This third rendering thus shows how the digital artwork would appear if the viewer had tilted the digital artwork back. In short, the different renderings of the digital artwork in the 3D model show how the digital artwork would appear when positioned differently with respect to a gaze direction and light direction. In certain embodiments of the invention, in the 3D model includes a fixed light direction and a fixed gaze direction and different renderings are created by positioning the digital artwork in the 3D model differently relative to the fixed light direction and gaze direction.

Embodiments of the invention allow a viewer to change which rendering of the digital artwork in 3D model is displayed by moving the display. For example, the viewer can tilt a tablet backwards to change the rendering of the digital artwork on the tablet as if the viewer where tilting a real piece of artwork back. In this example, a new rendering is determined by changing the digital artwork position in the 3D model relative to a fixed gaze direction and fixed light direction, and a new rendering is determined and displayed. Specifically, the digital artwork is tilted backwards in the 3D model in the same way the viewer tilted back the display. The new rendering is then determined based on the new relationship of the digital artwork in this tilted back position to the fixed light and gaze directions in the 3D model. The different digital artwork positions (i.e., rotations, tilts, translations, etc.) are thus determined based on corresponding movements of the display. These new digital artwork positions are in turn used to determine new renderings of the digital artwork. Specifically, depth effects in the renderings of the digital artwork depend on how the user moves the display. Each rendering of the digital artwork is based on a light direction, a gaze direction, the variable depths of the digital artwork, and a current position of the digital artwork in the 3D model. In determining the different renderings of the digital artwork, the light direction and gaze directions are fixed. However, the position of the digital artwork changes based on movement of the display, for example, as detected by a motion sensor.

The following example illustrates changing the rendering of the digital artwork in the 3D model based on moving a display. The gaze and light directions are initially set based on assumed or identified viewer and light source directions in world space. For example, the gaze direction can be assumed to be "head-on" to an initial orientation of the display, i.e., 90° from the plane of the face of the display. In an alternative example, the gaze direction is identified based on an actual position of a user detected using a camera or sensor. Initially the light direction can be assumed to come from a default position, such as from directly above the display. In an alternative example, the light direction is identified based on the position of an actual light source that is detected using a camera or sensor.

The initial position of the digital artwork in world space is also determined. An initial rendering of the digital artwork is displayed based on the initial position of the digital artwork in world space, the fixed light direction, the fixed gaze direction, and the 3D model of the variable depths of the digital artwork. Specifically, shadows, parallax offsets, and/or other depth effects are displayed based on the how the digital artwork is positioned relative to the fixed light direction and fixed gaze direction.

When the display is moved, a different rendering of the digital artwork is displayed on the display. A new position of the digital artwork in world space is determined based on the movement of the display. The result is that the digital artwork changes in relation to the fixed gaze direction and fixed light direction in world space. If the display is tilted back to face directly upwards, the position of the digital artwork is changed accordingly. Rather than being head-on to the fixed gaze direction, the digital artwork is now offset from the fixed gaze direction. Similarly, the digital artwork's relation to the fixed light direction is also changed. The fixed light direction continues to be straight down in world space but now the digital artwork is facing straight up. These changes in the digital artwork position relative to the fixed gaze direction and fixed light direction are used to determine and display a different rendering of the digital artwork with a different depth effect than the first rendering. For example, the shadows will be different and the parallax offsets will be different.

Multiple renderings of the digital artwork can be computed on-the-fly as the user moves the display in a continuous movement. Thus, as the user tilts the display back, a sequence or animation of different renderings of the artwork is displayed. The user thus has an experience similar to his experience when tilting real world artwork back. This interaction is more consistent to the way people interact with real impasto paintings and other digital artwork of variable depth than the input device-driven techniques of existing 3D rendering systems. The depth effects are perceptually more realistic and intuitive for the user.

Terminology

As used herein, the phrase "computing device" refers to any electronic component, machine, equipment, or system that can be instructed to carry out operations. Computing devices will typically, but not necessarily, include a processor that is communicatively coupled to a memory and that executes computer-executable program code and/or accesses information stored in memory or other storage. Examples of computing devices include, but are not limited to, desktop computers, laptop computers, server computers, tablets, telephones, mobile telephones, televisions, portable data assistant (PDA), e-readers, portable game units, smart watches, etc.

As used herein, the phrase "display" refers to any electronic component or output device that presents information for a user to view. Examples of displays include, but are not limited to, tablets, mobile phones, other mobile devices, laptops, computer monitors, televisions, and other devices that use cathode ray tubes, liquid crystal displays (LCDs), and light emitting diodes (LEDs) to present information for a user to view. A display can be integrated with or separate from the computing device used to perform operations to create renderings of digital artwork displayed on the display.

As used herein, the phrase "movement of a display" refers to a display being rotated, tilted, translated, and/or otherwise repositioned or reoriented. A movement of a display can be initiated and/or controlled by a user, for example, by a user rotating a tablet using his hands to view the surface of the tablet from a different perspective with different depth effects. Additionally, or alternatively, a movement of a display can be initiated and/or controlled by a computing device, for example, by a program that automatically moves a television on a wall to allow a viewer to view the surface of the television from different perspectives with different depth effects.

As used herein, the phrase "motion sensor" refers to any device that can detect a movement of a display. Examples of motion sensors include, but are not limited to, gyroscopes, accelerometers, and cameras.

As used herein, the phrase "digital artwork" refers to any created electronic content that can be rendered for viewing. Digital artwork can be based on real artwork. For example, 3D cameras or other capturing techniques can be used to capture the color and 3D shape of an impasto painting and digitally represent the impasto painting using pixels of variable colors and depths. In one specific example, a displacement or bump map is used to represent the depth of the pixels of an impasto painting or other digital artwork having depth variations. Digital artwork can also be created and/or edited using a computing device. For example, a user may use a content creation application to digitally create an impasto painting, sculpture, or other digital artwork having variable depth, i.e., digital artwork that is not flat.

As used herein, the phrase "rendering" refers to a graphical representation of digital artwork presented on a display. A rendering can be a 2 dimensional (2D) rendering based on a 3 dimensional (3D) model that includes the digital artwork.

As used herein, the phrase "3 dimensional (3D) model" refers to information about digital artwork that can be used to determine renderings of the digital artwork from different perspectives and/or information about a light direction and/or gaze direction used to create renderings of the digital artwork. In one example, a 3D model includes a first gaze direction, a fixed light direction, a position of the artwork relative to the fixed gaze direction and fixed light direction. This exemplary 3D model can then be used with information about the variable depths of the digital artwork (e.g., the depth at each pixel of an impasto painting) to provide a rendering of the digital artwork. Different renderings showing different perspectives of the digital artwork are created by altering the position of the digital artwork in the model relative to the fixed light direction and the fixed gaze direction.

As used herein, the phrase "position of the digital artwork" refers to the orientation and/or location of the digital artwork in a 3D model. Digital artwork can be repositioned in the 3D model, for example, by rotating, tilting, or translating the digital artwork relative to a fixed light direction and fixed gaze direction in the 3D model.

As used herein, the phrase "gaze direction" refers to a direction that hypothetical or actual viewer views digital artwork in a 3D model used to create renderings of the digital artwork from different perspectives.

As used herein, the phrase "light direction" refers to a direction of hypothetical or actual lighting that illuminates digital artwork in a 3D model used to create renderings of the digital artwork from different perspectives.

As used herein, the phrase "depth effect" refers to any difference in appearance of digital artwork based on different gaze directions and/or light directions. Depth effects include but are not limited to shadow occlusion and parallax offset.

As used herein, the phrase "shadow occlusion" refers to a depth effect provided by displaying shadows where deeper portions of the digital artwork block light to thinner portions on a surface of the digital artwork. The shadows will differ for different gaze directions and light directions relative to the digital artwork.

As used herein, the phrase "parallax offset" refers to a depth effect provided by changing the appearance of a flat representation of digital artwork based on the digital artwork depth and gaze direction. For example, determining parallax offset can involve representing the digital artwork as a flat reference plane of pixel values for a straight-on gaze direction. Parallax offsets are determined for each pixel based on a depth of the digital artwork at the pixel relative to the reference plane and based on the fixed gaze direction. The rendering of the digital artwork uses the offset pixel color values for each pixel rather than the pixel values at the corresponding pixel positions in the reference plane.

As used herein, the phrase "impasto painting" refers to a painting that is created by intentionally laying paint thickly in places in the painting. A digital impasto painting can be created by capturing a real world impasto painting using 3D cameras and the like. A digital impasto painting can alternatively be created using a content creation application on a computing device that allows the user to specify variable paint thicknesses. Impasto paintings often show the shape of brushes and strokes, interleaving between paint and canvas fiber, and the layered mixture of paint colors.

Exemplary Computing Environment

Figure 1:
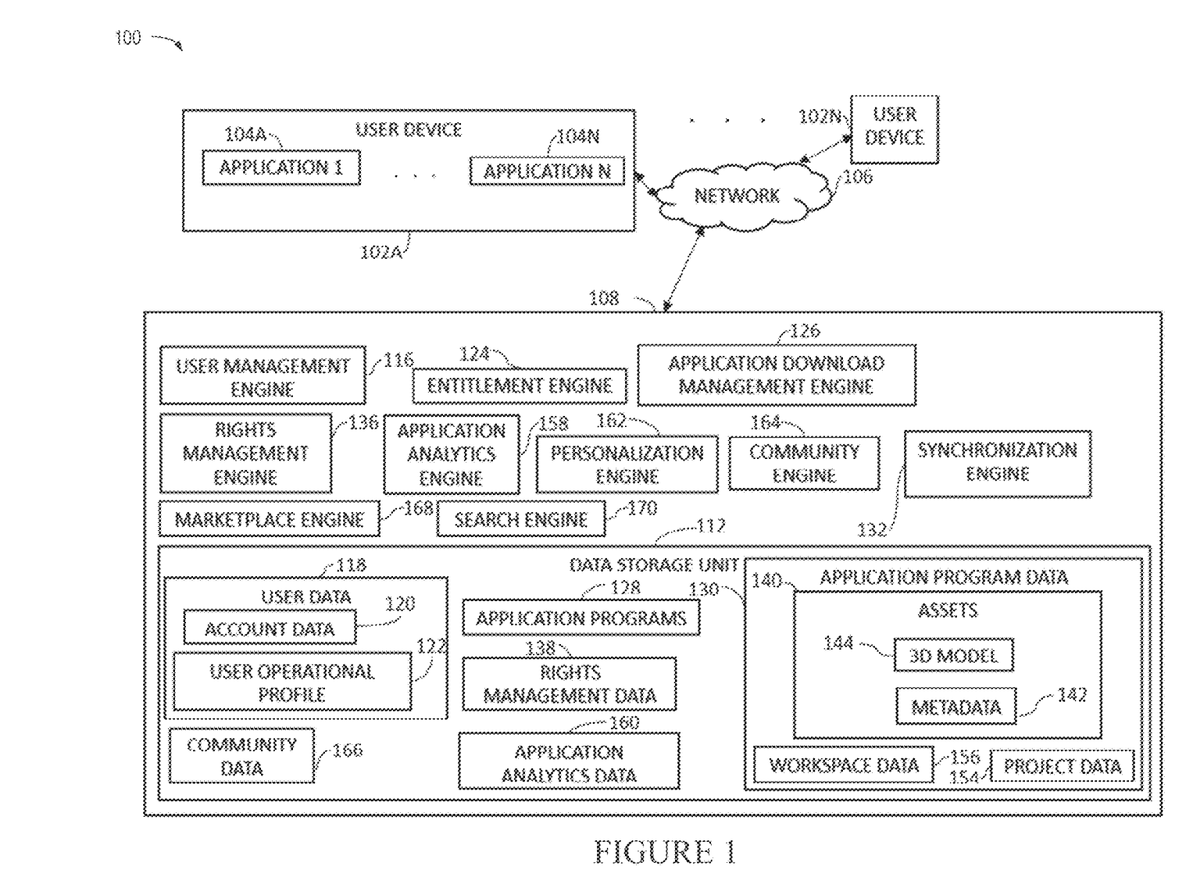
FIG. 1 is a diagram of an environment in which one or more techniques of the invention can be practiced.

FIG. 1 is a diagram of an environment 100 in which one or more embodiments of the present disclosure can be practiced. The environment 100 includes one or more user devices, such as a user device 102A up to a user device 102N. Each of the user devices is connected to a creative apparatus 108 via a network 106. Users of the user devices uses various products, applications, or services supported by the creative apparatus 108 via the network 106. The user devices correspond to various users. Examples of the users include, but are not limited to, creative professionals or hobbyists who use creative tools to generate, edit, track, or manage creative content, end users, administrators, developers, content owners, content managers, content creators, content viewers, content consumers, designers, editors, any combination of these users, or any other user who uses digital tools to create, view, edit, track, or manage digital experiences.

Digital tool, as described herein, includes a tool that is used for performing a function or a workflow electronically. Examples of the digital tool include, but are not limited to, content creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. Digital tools include the creative apparatus 108.

Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content.

Content, as described herein, includes electronic content. Examples of the content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

Examples of the user devices 102A-N include, but are not limited to, a personal computer (PC), tablet computer, a desktop computer, a processing unit, any combination of these devices, or any other suitable device having one or more processors. Each user device includes at least one application supported by the creative apparatus 108.

It is to be appreciated that following description is now explained using the user device 102A as an example and any other user device can be used.

Examples of the network 106 include, but are not limited to, internet, local area network (LAN), wireless area network, wired area network, wide area network, and the like.

The creative apparatus 108 includes one or more engines for providing one or more digital experiences to the user. The creative apparatus 108 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. The creative apparatus 108 also includes a data storage unit 112. The data storage unit 112 can be implemented as one or more databases or one or more data servers. The data storage unit 112 includes data that is used by the engines of the creative apparatus 108.

A user of the user device 102A visits a webpage or an application store to explore applications supported by the creative apparatus 108. The creative apparatus 108 provides the applications as a software as a service (SaaS), or as a standalone application that can be installed on the user device 102A, or as a combination. The user creates an account with the creative apparatus 108 by providing user details and also by creating login details. Alternatively, the creative apparatus 108 can automatically create login details for the user in response to receipt of the user details. In some embodiments, the user is also prompted to install an application manager. The application manager enables the user to manage installation of various applications supported by the creative apparatus 108 and also to manage other functionalities, such as updates, subscription account and the like, associated with the applications. The user details are received by a user management engine 116 and stored as user data 118 in the data storage unit 112. In some embodiments, the user data 118 further includes account data 120 under which the user details are stored.

The user can either opt for a trial account or can make payment based on type of account or subscription chosen by the user. Alternatively, the payment can be based on product or number of products chosen by the user. Based on payment details of the user, a user operational profile 122 is generated by an entitlement engine 124. The user operational profile 122 is stored in the data storage unit 112 and indicates entitlement of the user to various products or services. The user operational profile 122 also indicates type of user, i.e. free, trial, student, discounted, or paid.

The user management engine 116 and the entitlement engine 124 can be one single engine performing the functionalities of both the engines.

The user then installs various applications supported by the creative apparatus 108 via an application download management engine 126. Application installers or application programs 128 present in the data storage unit 112 are fetched by the application download management engine 126 and made available to the user directly or via the application manager. In one embodiment, all application programs 128 are fetched and provided to the user via an interface of the application manager. In another embodiment, application programs 128 for which the user is eligible based on user's operational profile are displayed to the user. The user then selects the application programs 128 or the applications that the user wants to download. The application programs 128 are then downloaded on the user device 102A by the application manager via the application download management engine 126. Corresponding data regarding the download is also updated in the user operational profile 122. An application program 128 is an example of the digital tool. The application download management engine 126 also manages process of providing updates to the user device 102A.

Upon download, installation and launching of an application program, in one embodiment, the user is asked to provide the login details. A check is again made by the user management engine 116 and the entitlement engine 124 to ensure that the user is entitled to use the application program. In another embodiment, direct access is provided to the application program as the user is already logged into the application manager.

The user uses one or more application programs 128 to create one or more projects or assets. In addition, the user also has a workspace within each application program. The workspace, as described herein, includes setting of the application program, setting of tools or setting of user interface provided by the application program, and any other setting or properties specific to the application program. Each user has a workspace. The workspace, the projects or the assets are then stored as application program data 130 in the data storage unit 112 by a synchronization engine 132. The application program data 130 can be specific to the user or can be shared with other users based on rights management. The rights management is performed by a rights management engine 136. Rights management rules or criteria are stored as rights management data 138 in the data storage unit 112.

The application program data 130 includes one or more assets 140. The assets 140 can be a shared asset which the user wants to share with other users or which the user wants to offer on a marketplace. The assets 140 can also be shared across multiple application programs 128. Each asset includes metadata 142. Examples of the metadata 142 include, but are not limited to, color, size, shape, coordinate, a combination of any of these, and the like. In addition, in one embodiment, each asset also includes a file. Examples of the file include, but are not limited to, a file that includes a 3D model 144. In an alternative embodiment, the 3D model is stored in multiple files, Renderings created using the 3D model 144 can also be stored. For example, 2D renderings of digital artwork in the 3D model 144 can be stored that show different views of the digital artwork positioned differently relative to a fixed gaze direction and/or light direction in the 3D model 144. These renderings can be stored as assets 140.

The application program data 130 also includes project data 154 and workspace data 156. In one embodiment, the project data 154 includes the assets 140. In another embodiment, the assets 140 are standalone assets. Similarly, the workspace data 156 can be part of the project data 154 in one embodiment, while it may be standalone data in other embodiments.

The user can have one or more user devices. The application program data 130 is accessible by the user from any device, i.e. including the device which was not used to create the assets 140. This is achieved by the synchronization engine 132 that stores the application program data 130 in the data storage unit 112 and makes the application program data 130 available for access by the user or other users via any device. Before accessing the application program data 130 by the user from any other device or by any other user, the user or the other user may need to provide login details for authentication if not already logged in. Else, if the user or the other user are logged in then a newly created asset or updates to the application program data 130 are provided in real time. The rights management engine 136 is also called to determine whether the newly created asset or the updates can be provided to the other user or not. The workspace data 156 enables the synchronization engine 132 to provide same workspace configuration to the user on any other device or to the other user based on the rights management data 138.

In some embodiments, the user interaction with the application programs 128 is also tracked by an application analytics engine 158 and stored as application analytics data 160. The application analytics data 160 includes, for example, usage of a tool, usage of a feature, usage of a workflow, usage of the assets 140, and the like. The application analytics data 160 can include the usage data on a per user basis and can also include the usage data on a per tool basis or per feature basis or per workflow basis or any other basis. The application analytics engine 158 embeds a piece of code in the application programs 128 that enables an application program to collect the usage data and send it to the application analytics engine 158. The application analytics engine 158 stores the usage data as the application analytics data 160 and processes the application analytics data 160 to draw meaningful output. For example, the application analytics engine 158 can draw an output that the user uses "Tool 4" maximum number of times. The output of the application analytics engine 158 is used by a personalization engine 162 to personalize tool menu for the user to show "Tool 4" on top. Other types of personalization can also be performed based on the application analytics data 158. In addition, the personalization engine 162 can also use the workspace data 156 or the user data 118 including user preferences to personalize one or more application programs 128 for the user.

The creative apparatus 108 also includes a community engine 164 which enables creation of various communities and collaboration among the communities. A community, as described herein, includes a group of users that share at least one common interest. The community can be closed, i.e. limited to a number of users or can be open, i.e. anyone can participate. The community enables the users to share each other's work and comment or like each other's work. The work includes the application program data 140. The community engine 164 stores any data corresponding to the community, such as work shared on the community and comments or likes received for the work as community data 166. The community data 166 also includes notification data and is used for notifying other users by the community engine in case of any activity related to the work or new work being shared. The community engine 164 works in conjunction with the synchronization engine 132 to provide collaborative workflows to the user. For example, the user can create a 3D model and can request for some expert opinion or expert editing. An expert user can then either edit the 3D model as per the user liking or can provide expert opinion. The editing and providing of the expert opinion by the expert is enabled using the community engine 164 and the synchronization engine 132. In collaborative workflows, each of a plurality of users are assigned different tasks related to the work.

The creative apparatus 108 also includes a marketplace engine 168 for providing a marketplace to one or more users. The marketplace engine 168 enables the user to offer an asset for sale or use. The marketplace engine 168 has access to the assets 140 that the user wants to offer on the marketplace. The creative apparatus 108 also includes a search engine 170 to enable searching of the assets 140 in the marketplace. The search engine 170 is also a part of one or more application programs 128 to enable the user to perform search for the assets 140 or any other type of the application program data 130. The search engine 170 can perform a search for an asset using the metadata 142 or the file.

It is to be appreciated that the engines and working of the engines are described as examples herein and the engines can be used for performing any step in providing digital experience to the user.

Exemplary Models for Displaying Renderings of Digital Artwork

Figure 2:
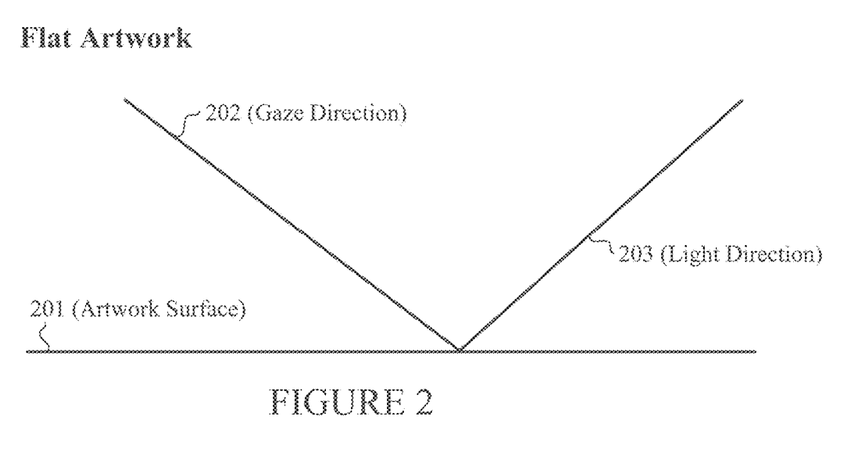
FIG. 2 illustrates a side view of exemplary two dimensional (2D) model for displaying renderings of digital artwork.

FIG. 2 illustrates a side view of an exemplary 2 dimensional (2D) model for displaying renderings of digital artwork. In this example, the digital artwork has a flat artwork surface 201. In the case of such flat digital artwork, the appearance of the artwork is simply based on the artwork surface. Since the artwork surface does not have depth, the appearance of the artwork does not need to be rendered by determining depth effects that are based on the variable depths when viewed from a gaze direction 202 and with light direction 203. In contrast, a rendering of digital artwork having variable depth should provide depth effects to provide a realistic appearance, as described next with respect to FIG. 3.

Figure 3A:
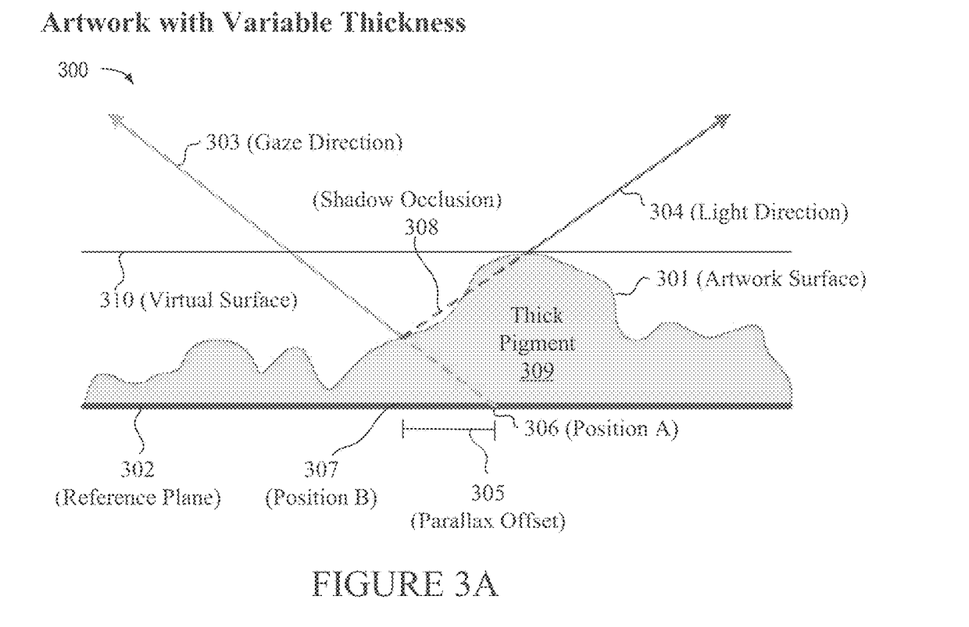
FIG. 3A illustrates a cross section view of exemplary three dimensional (3D) model for displaying renderings of digital artwork of variable thickness.

FIG. 3A illustrates a cross section view of an exemplary 3 dimensional (3D) model 300 for displaying renderings of digital artwork of variable thickness. In this example, the digital artwork has an artwork surface 301 of variable depths. In this example, the digital artwork is an impasto painting, that uses depth information to represent the depth of the impasto painting at different pixels of the painting relative to a reference plane 302. Because of the depths, given the gaze direction 303 and the light direction 304 depth effects are determined to display realistic renderings of the digital artwork. FIG. 3A illustrates examples of determining parallax offset 305 and shadow occlusion 308 depth effects In FIG. 3A, a parallax offset 305 depth effect is illustrated. The parallax offset 305 is based on the thickness of the digital artwork. In this example, a realistic rendering of the digital artwork surface 301 will not simply display the pixels of the reference plane 302. The reference plane 302 includes pixel color values of a flat representation of the digital artwork as the artwork would appear when viewing the artwork head-on, i.e., with no parallax offsets. When viewing the digital artwork head-on, the pixel color displayed at position A 306 is the color of the corresponding pixel at position A 306 in the reference plane 302. However, given the gaze direction 303, a parallax offset 305 is used and results in the pixel color of position B 307 being used for the pixel color at position A 306 in the rendering. In other words, because of the thickness at position B 307, the user does not see all the way to position A 306 as he would if the digital artwork were flat. The parallax offset 305, and similar parallax offsets determined for all pixel positions in the digital image, are used to provide a rendering of the digital artwork that accounts for the variable depth within the digital artwork.

A shadow occlusion 305 is also illustrated in FIG. 3A. A shadow occlusion 308 depth effect is used to adjust the appearance of the rendering of the artwork. The shadow occlusion 308 is determined based on determining that the thick pigment 309 blocks light from light direction 304 from directly hitting portions of the artwork surface 301. When rendering the digital artwork, the pixels that are in positions occluded by shadows are darkened.

Figure 3B:
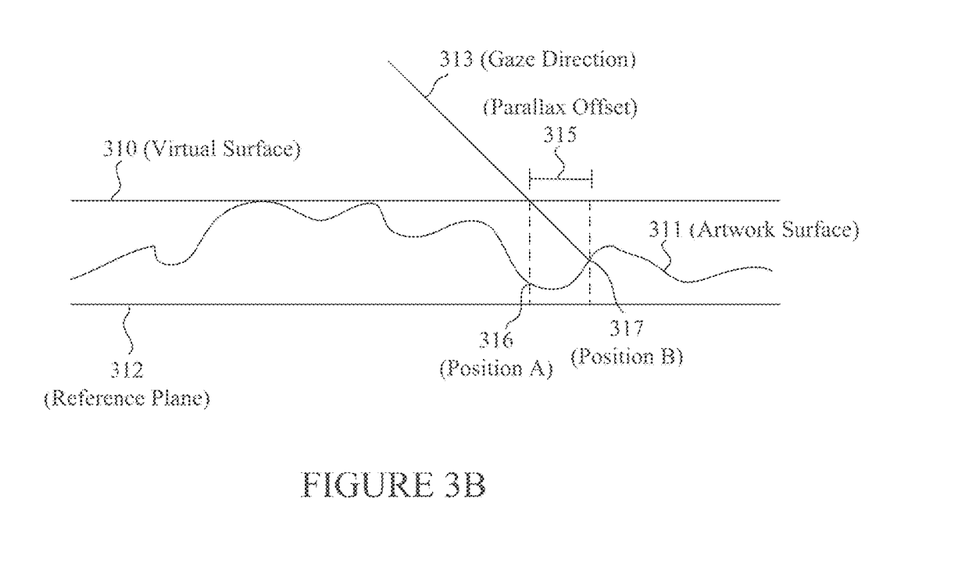
FIG. 3B illustrates a cross section view of exemplary 3 dimensional (3D) model of digital artwork of variable thickness used to account for parallax offset in generating a 2D image.

FIG. 3B illustrates a cross section view of exemplary 3 dimensional (3D) model of digital artwork of variable thickness used to account for parallax offset in generating a 2D image. In this example, the digital artwork has an artwork surface 311 of variable depths and uses depth information to represent the depth of the digital artwork at different pixels relative to a reference plane 312. In this example, a virtual surface 310 is used to create a 2D image that accounts for the parallax offset. Traditional texture mapping would use the color location of position A 316 directly under the location that a gaze direction 313 ray hits the virtual surface 310 because it assumes zero thickness. FIG. 3B illustrates a parallax offset mapping, or relief mapping, technique that determines the location of position B 317 where the gaze direction 313 would have intersected the artwork surface 311. The pixel of the virtual surface 310 is thus based on position B 317 rather than position A 316, and the difference between the two positions 316, 317 is the parallax offset.

Techniques of the invention compute pixel values for all positions of the virtual surface 310. This can involve sending a geometric primitive to a graphics processing unit (GPU) or other process such as a quadrilateral representing the virtual surface 310 and a height field of other representation of the 3D geometry. For example, the height field or other geometry information can be encoded in a texture map. The gaze direction is also provided. The GPU or other processor applies the parallax offset mapping technique using the received information to determine pixel values for all positions of the virtual surface 310.

Shadow occlusions can similarly be determined using a GPU or other processor that receives the representation of the surface, a height field of other representation of the 3D geometry, and the light direction. The GPU or other processor applies a shadow detection technique using the received information to determine pixel values for all positions of the virtual surface. The GPU or other processor can compute parallax offsets and shadow occlusions individually or in a combined operation.

Techniques for Displaying Depth Effects in Digital Artwork Based on Movement of a Display Techniques of the invention, display digital artwork on a display, such as the display of a tablet device. The techniques provide different renderings of the digital artwork on the display based on the movement of the display. For example, as the display is moved, one or more built-in motion sensors detect changes in the position of the tablet and corresponding changes are made in a model used to render the digital artwork from different perspectives. In this example, the user can interact with the display by moving it to different positions to observe the artwork from different perspectives. This is a much more natural interaction for users who have the impression that they are holding and moving the artwork using their hands. The users can rotate the display as they like and the parallax offset, shadow occlusions, and other depth effects are updated accordingly.

The techniques update renderings of the digital artwork based on the movement of the display using a model. The model assumes fixed gaze direction and light direction but adjusts the relative position of the digital artwork in the model based on the movement of the display. Because of the natural interaction scheme, the thickness is perceptually more intuitive and realistic to the user. Moreover, the user can avoid having to use a mouse, keyboard, or touch screen to explicitly change a position of model parameters. The user can be unaware of the model and simply interact with the display as if the display were the digital artwork, by rotating, tilting, and moving the artwork.

Figure 4:
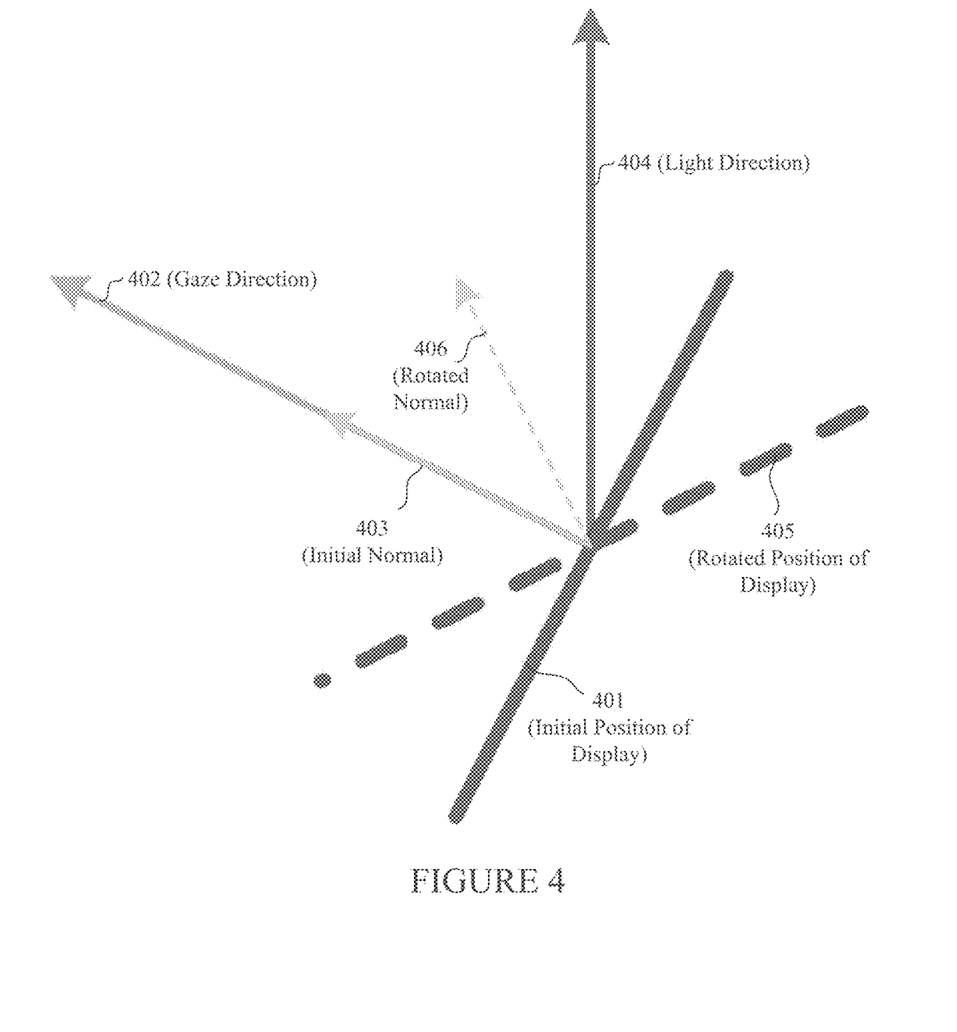
FIG. 4 illustrates a side view of a depiction of changing a position of a display relative to a fixed gaze direction and a fixed light direction.

FIG. 4 illustrates a side view of a depiction of changing a position of a display relative to a fixed gaze direction and a fixed light direction in a model. In this example the display is initially positioned in position 401. This initial position 401 of the display can be based on a default or predetermined position or can be detected using one or more motion sensors on the device.

A gaze direction 402 is determined. The gaze direction can be based on a predetermined direction relative to the initial position 401 of the display. For example, the gaze direction 402 in this example is initially set based on the initial normal 403 of the display in its initial position 401. In an alternative technique, a camera or other sensor is used to detect an actual position of a viewer and the gaze direction 502 is based on that actual position.

A light direction 404 is determined. The light direction 504 can be a predetermined direction or can be based on a predetermined orientation relative to the initial position 401 of the display. The light direction 404 can alternatively be based on a predetermined orientation relative to gravity. For example, using a motion sensor, the light direction 404 can be set to straight up relative to gravity. The light direction 404 can alternatively be based on a camera or other sensor detecting an actual position of a light source.

The gaze direction 402 and the light direction 404 are fixed relative to world space, which is a 3D coordinate system based on the real world in which different perspective renderings of digital artwork can be determined. Thus, FIG. 4 illustrates a rotated position of the display 405 with rotated normal 406. Even though the display has been rotated the light direction 404 and gaze direction 402 remain fixed in the model.

Embodiments of the invention provide techniques, systems, and computer-readable mediums with stored instructions that enable display of different renderings of the digital artwork on a display based on the movement of the display. The functions involved in these embodiments of the invention generally involve determining a movement of the display, determining a position of the digital artwork in a 3D model based on the movement of the display, and displaying a rendering of the digital artwork on the display based on the position of the digital artwork in the 3D model. These functions are generally implemented on one or more computing devices that use one or more processors to execute algorithms of one or more operations defined in stored instructions. The operations of various exemplary algorithms that can be employed to perform these functions are discussed in the FIGURES and throughout this specification.

The function of determining movements of a display can be performed using sensors and/or one or more computing devices implementing various algorithms by executing stored instructions. The algorithms can include any of the exemplary techniques disclosed herein as well as modifications to the techniques herein to address particular circumstances of an implementation. In non-limiting examples, a gyroscope, accelerometer, camera, or some combination of one or more of these devices, captures information about a movement of a display. The information about the movement of the display is interpreted via an algorithm. An exemplary algorithm interpreting such information can involve receiving the information and determining one or more attributes about the movement of the display based on the information. For example, this can involve determining a direction of a translation, an amount of translation, e.g., in inches, feet, meters, etc., a direction of rotation, an amount of rotation, e.g., an angle of rotation, a direction of tilt, and/or an amount of tilt, e.g., an angle of tilt. In another example, the one or attributes are determined relative to a starting position of the device. For example, at the beginning of a viewing session an initial position of the device can be stored. As the device is moved through various subsequent movements, the new positions of the device can be determined relative to that starting position. Additional attributes defining a movement and/or new position of a device can additionally or alternatively be used. For example, one or more positions of a display can be represented using vectors and a movement specified using a starting and/or ending vector associated with a movement of the display.

The function of determining positions of the digital artwork in a 3D model based on the movements of the display can be performed using one or more computing devices implementing various algorithms by executing stored instructions. The algorithms can include any of the exemplary techniques disclosed herein as well as modifications to the techniques herein to address particular circumstances of an implementation. An exemplary algorithm for determining positions of the digital artwork involves receiving information about a movement of a display and using that information to determine a position of the digital artwork in the 3D model. The position of the digital artwork can be based on the movement in various ways. In one example, the change in position is determined to exactly match the movement. For example, if the viewer tilts the display back 15 degrees, the digital artwork is tilted back 15 degrees in the 3D model. In another example the change in position is based on the movement but differs from the movement with respect to one or more attributes. For example, titling the display back 15 degrees can result in tilting the digital artwork back 10 degrees. In another example, the change in position can be limited to particular types of movement of the display. For example, a rotation of the display can result in a corresponding change in the rotation of the digital artwork in the 3D model, but a translation of the model up and down may not result in a change in the position of the digital artwork in the 3D model.

The function of displaying the renderings of the digital artwork on the display based on the positions of the digital artwork in the 3D model can be performed using one or more computing devices implementing various algorithms by executing stored instructions. The algorithms can include any of the exemplary techniques disclosed herein as well as modifications to the techniques herein to address particular circumstances of an implementation. An exemplary algorithm for displaying the renderings of the digital artwork on the display based on the positions of the digital artwork in the 3D model can involve receiving positions of the digital artwork in the 3D model and determining different renderings of the digital artwork for each of the positions. In one example algorithm, displaying the renderings of the digital artwork involves determining parallax offsets for the renderings based on the positions of the digital artwork relative to a fixed gaze direction. In another example algorithm, displaying the renderings of the digital artwork involves determining shadow occlusions for the renderings based on the positions of the digital artwork relative a fixed light direction. Positions of the digital artwork can be received one at a time at separated time intervals or quickly one after another during a movement. The algorithm for displaying the renderings can involve displaying a sequence of the renderings of the digital artwork during a movement. In this embodiment of the invention, the display of digital artwork changes as the user moves the artwork.

Figure 5:
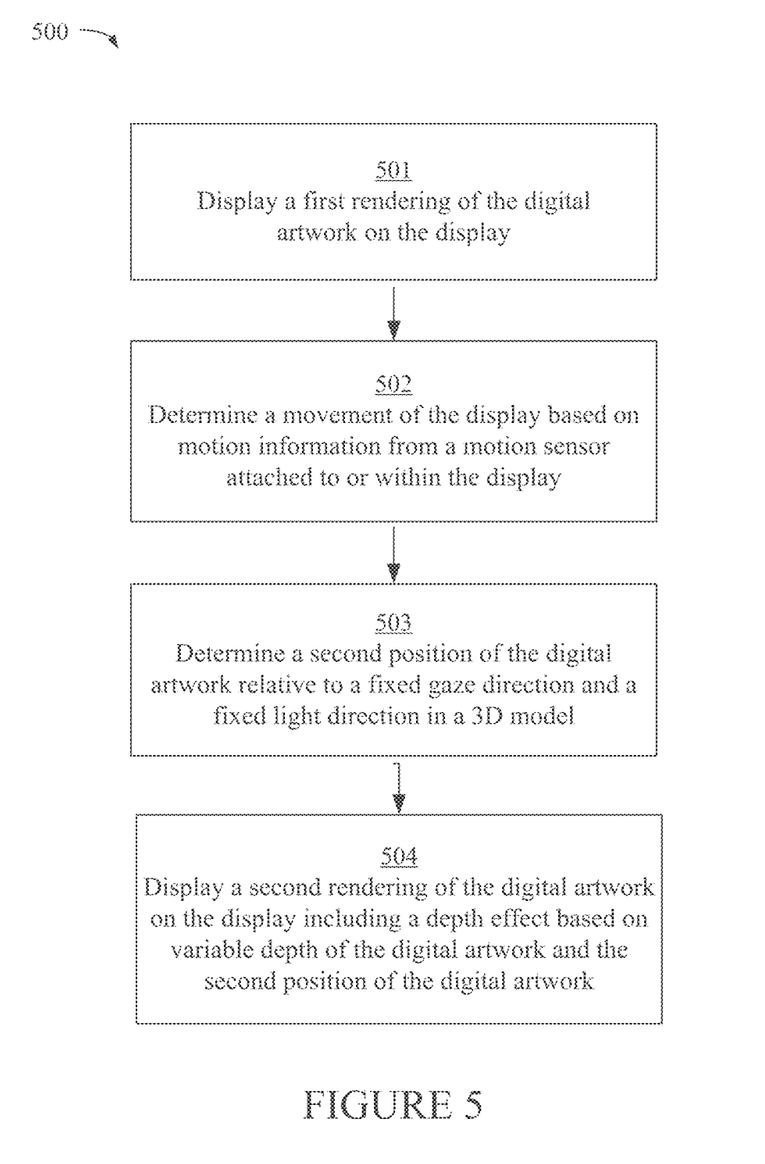
FIG. 5 illustrates is a flow chart illustrating an exemplary technique for displaying depth effects in digital artwork based on movement of a display.

FIG. 5 illustrates is a flow chart illustrating an exemplary technique for displaying depth effects in digital artwork based on movement of a display. The exemplary technique 500 can be implemented by user device 102A of FIG. 1, although other devices and configurations can also be implemented. The exemplary technique 500 can be implemented by storing and executing instructions in a non-transitory computer-readable medium.

Method 500 involves displaying a first rendering of the digital artwork on the display, as shown in block 501. The first rendering of the digital artwork can, but need not, display depth effects for the digital artwork. In one technique, the first rendering of the digital artwork assumes a head-on gaze direction, perpendicular to the surface of the display and the artwork displayed in the display, so that there is not parallax offset. In an alternative technique, a camera or other sensor detects the user's actual location and an initial gaze direction is based on the user's actual location. The gaze direction is used to determine parallax offsets, if any, in the first rendering of the digital artwork.

The light direction used for the first rendering of the digital artwork is based on a default direction in one technique. For example, the default light direction can be straight up relative to gravity as determined using a motion sensor with in the display. In an alternative technique, a camera or other sensor detects the actual location(s) of a light source and an initial light direction is based on the actual light source location. The light direction is used to determine shadow occlusions in the first rendering of the digital artwork.

An appropriate algorithm or other computational technique uses the information about the digital artwork to determine a rendering of the device. One exemplary algorithm uses the rendering using depth variations of the digital artwork (e.g., a displacement or bump map, etc.) and its position relative to the gaze direction and light source in a 3D model. The particular computational technique used can be tailored for the particular type of digital artwork. For example, for impasto paintings having relatively shallow depths (compared to sculptures), a technique can be used that assumes a relatively flat underlying reference plane. rendering calculation can account for additional and/or different inputs. For example, the rendering calculation can account for the distance away of the viewer, the distance away of the light source, multiple light sources, multiple viewers, the intensity of a light source, among other variables. For example, a camera can be used to detect a light source position relative to the display and that information used to define both a light source distance and light direction. Similarly, a camera can be used to detect a viewer position relative to the display and that information used to define both a user distance and gaze direction.

Figure 6:
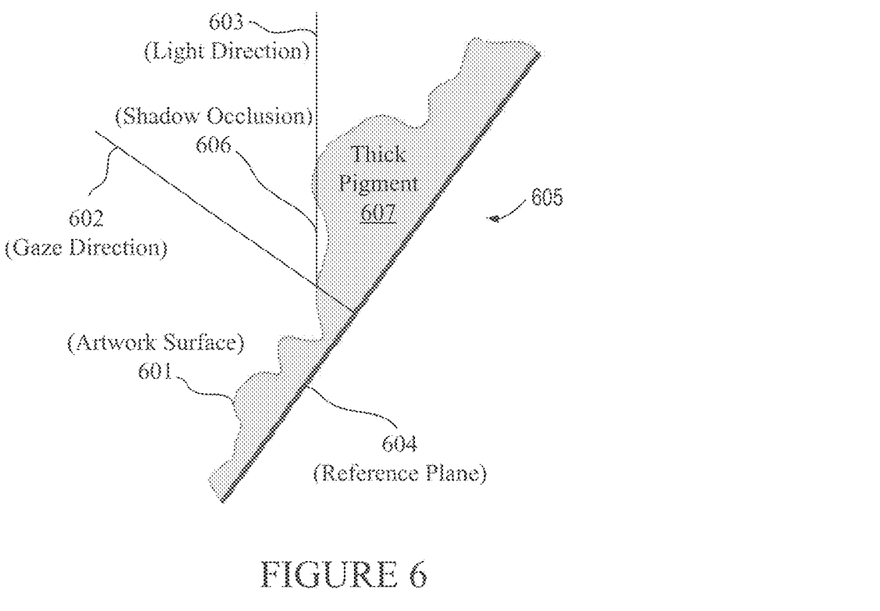
FIG. 6 illustrates a cross section view of a depiction of a first position of digital artwork having variable thickness relative to a fixed gaze direction and a fixed light direction in a 3D model.

FIG. 6 illustrates a cross section view of a depiction of digital artwork having variable thickness relative to a fixed gaze direction and a fixed light direction in a 3D model. In this example, the digital artwork has an artwork surface 601 comprising pixels at variable depths away from reference plane 604. The depths of the pixels at different locations in the digital artwork can be stored as a displacement or depth map. The gaze direction 602 is normal to the reference plane 604 of the digital artwork. The light direction 603 is straight down based on gravity. A second rendering of the artwork can be determined based on the variable depth of the artwork surface 601 and the relationship of the digital artwork in this first position 605 relative to the gaze direction 602 and the light direction 603. The first rendering will include a depth effect to account for the shadow occlusion 606 based on the thick pigment 607. The first rendering will not include a parallax offset since the gaze direction 602 is perpendicular to the reference plane 604 of the digital artwork.

Returning to FIG. 5, method 500 further involves determining a movement of the display based on motion information from a motion sensor attached to or within the display, as shown in block 502. This can involve determining the movement of the display by detecting a rotation or tilt of the display using a gyroscope, detecting a translation of the display using an accelerometer, or detecting a combination of rotation, tilt, and/or translation using a gyroscope, accelerometer, or any other motion sensor. In block 502, the motion sensor is attached to or within the display. In alternative embodiments, a motion sensor can be separate from the display. For example, one or more cameras separate from the display can capture images of the display and determine movement of the display based on those images.

Method 500 further involves determining a second position of the digital artwork relative to a fixed gaze direction and a fixed light direction in a 3 dimensional (3D) model, as shown in block 503. The second position of the artwork is determined based on the movement of the display. For example, if the display is rotated back 45 degrees, the artwork is rotated back 45 degrees relative to the fixed gaze direction and the fixed light direction in the 3D model. The fixed gaze direction and/or fixed light direction if not already determined can be determined using, for example, the techniques discussed above with respect to block 501.

Method 500 next involves displaying a second rendering of the digital artwork on the display including a depth effect based on variable depth of the digital artwork and the second position of the digital artwork, as shown in block 504. Displaying the depth effect can involve displaying shadow occlusions, parallax offsets, and/or other depth-based variations in the rendering.

Figure 7:
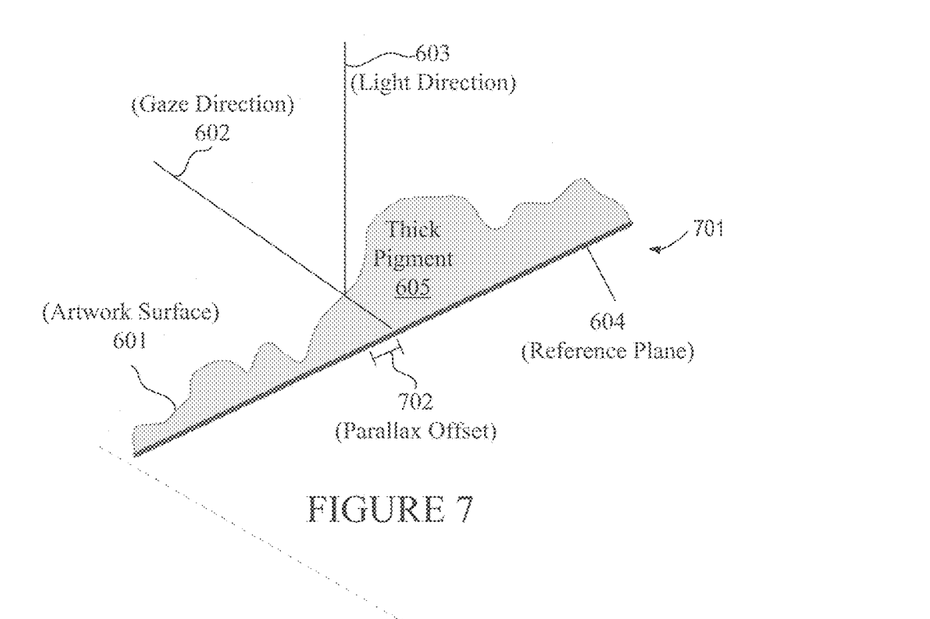
FIG. 7 illustrates a cross section view of a depiction of a second position of the digital artwork of FIG. 6 relative to the fixed gaze direction and the fixed light direction in the 3D model.

FIG. 7 illustrates a cross section view of a depiction of a second position of the digital artwork of FIG. 6 relative to the fixed gaze direction and the fixed light direction in the 3D model. The digital artwork has the same artwork surface 601 comprising pixels at variable depths away from reference plane 604. The gaze direction 602 is fixed in world space. However, based on a movement of a display, the digital artwork is moved to the second position 70. In other words, in the second position 701, the reference plane 604 of the digital artwork has a different (non-normal) relationship to the gaze direction 602. The light direction 603 is fixed and thus remains straight down in the 3D model. A second rendering of the artwork can be determined and displayed based on the variable depth of the artwork surface 601 and the relationship of the digital artwork in the second position 701 to the gaze direction 602 and the light direction 603. The second rendering will include a depth effect to account for the parallax offset 702 based on the gaze direction 602.

Returning to FIG. 5, method 500 can involve displaying multiple renderings on-the-fly as the display is moved. This involves determining different positions of the digital artwork during the movement relative to the fixed gaze direction and the fixed light direction in the 3D model. During the movement, a sequence of renderings of the digital artwork is displayed with different depth effects based on the different positions of the digital artwork. In the sequence of renderings, the digital artwork is aligned with a surface of the display in one example. This makes the user's interaction realistic. The user is able to move the display as if the digital artwork were part of the display, e.g., as if an impasto painting were painted on the surface of the display, and see the same depth variations during the movements that the user would see if he were moving real world artwork.

Figure 8:
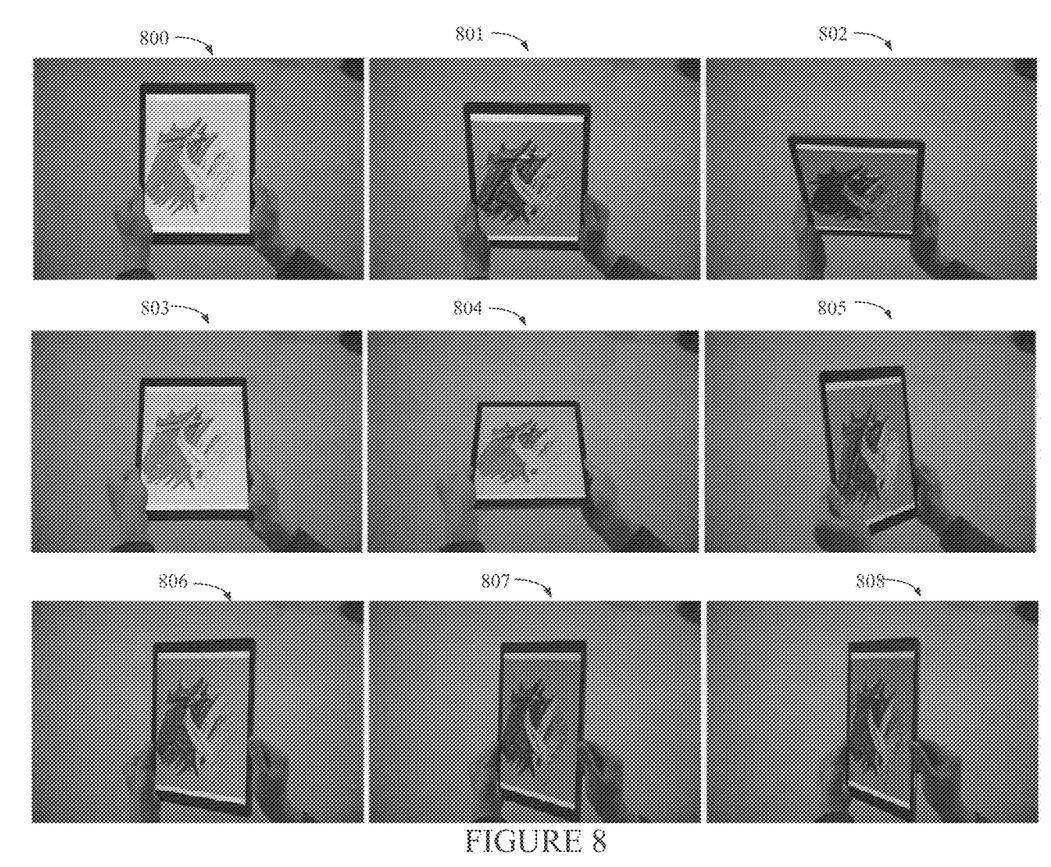
FIG. 8 illustrates a series of photographs depicting movements of a tablet displaying digital artwork detected by a motion sensor and used to determine renderings of the digital artwork that depict different depth effects based on the movements.

FIG. 8 illustrates a series of photographs 800-808 depicting movements of a tablet displaying digital artwork detected by a motion sensor and used to determine renderings of the digital artwork that depict different depth effects based on the movements. FIG. 8 illustrates how a user might move a display, in this case a tablet, around to view digital artwork from different perspectives. Being able to move the digital artwork by moving the device to view the different perspectives provides an intuitive and natural viewing experience for the user.

One technique of the invention provides user control over the initial conditions of the user's interaction with the digital artwork. The user is able to reinitialize the experience by selecting a user interface option, e.g., a "reinitialize" or "reset" button. This control can be used to reset the fixed gaze direction and the fixed light direction. Thus, the user can display the digital artwork, position the display so that the user is directly facing the display and press the reset button. The technique responds by saving the current position of the display, fixing the light direction and gaze direction, and displays a rendering of the digital artwork based on these reset parameters. These parameters are used to provide different renderings as the user then moves the display from that point on, until the user again presses the reset button.

Another technique of the invention enhances the appearance of digital artwork with surrounding depth-based content. For example, a frame or border can be placed around the digital artwork and the depth effects can be shown on the frame as well as the digital content. Similarly, a reference object, such as gold foil or another object with high reflectance, can be included in or around the artwork to enhance the intuitiveness of the depth variations displayed in renderings of the digital artwork.

While the techniques of the invention have generally been described in the context of rendering digital artwork to allow a user to view the artwork, the techniques are equally applicable to creating and editing digital artwork. The renderings of the artwork can be provided within an editing canvas. The user can reposition the display during the editing process to gain a better understanding and appreciation of the depth in the digital artwork that is being edited. This can allow a user to more easily create an impasto painting by allowing the user to better appreciate the depth that the user is adding as the paint is added to the editing canvas. Similarly, if the user is creating a 3D sculpture using a 3D editing interface, the user can rotate the 3D sculpture using the techniques disclosed herein. For example, if the user is working on the front of the face of a sculpture and wants to add material or paint to a side of the face, the user can simply rotate the display to rotate the sculpture and more easily access the side portion of the sculpture. The user is thus able to interact with the object that is being created as if the display were the object being created. This avoids the need for using a mouse or other input device to make such movements.

While the techniques of the invention have generally been described and illustrated with flat displays, the techniques of the invention are also applicable to displays having other shapes. For example, a curved display could be used, or multi-sided display (e.g., with displays at right angles to one another) could be used. In another example technique, a user uses a flexible display and bends the display to change the interaction or view of the artwork. Accordingly, the change of the display shape can be used as an input that changes the shape of the digital artwork in determining how the digital artwork is rendered.

Exemplary Computing Environment

Figure 9:
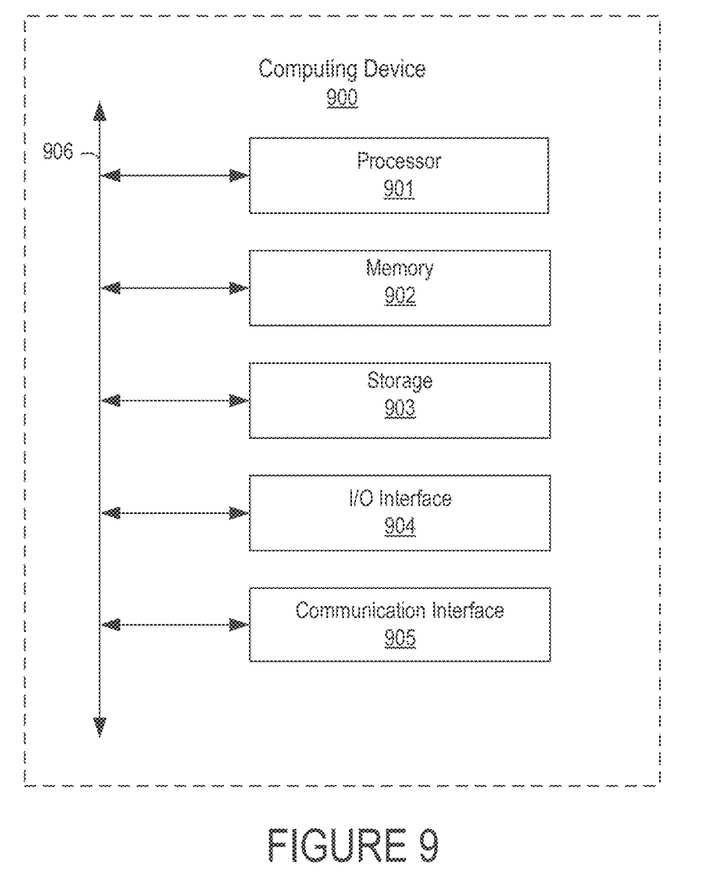
FIG. 9 is a block diagram depicting an example hardware implementation.

Any suitable computing system or group of computing systems can be used to implement the techniques and methods disclosed herein. For example, FIG. 9 is a block diagram depicting examples of implementations of such components. The computing device 90 can include a processor 91 that is communicatively coupled to a memory 92 and that executes computer-executable program code and/or accesses information stored in memory 92 or storage 93. The processor 91 may comprise a microprocessor, an application-specific integrated circuit ("ASIC"), a state machine, or other processing device. The processor 91 can include one processing device or more than one processing device. Such a processor can include or may be in communication with a computer-readable medium storing instructions that, when executed by the processor 91, cause the processor to perform the operations described herein.

The memory 92 and storage 93 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 90 may also comprise a number of external or internal devices such as input or output devices. For example, the computing device is shown with an input/output ("I/O") interface 94 that can receive input from input devices or provide output to output devices. A communication interface 95 may also be included in the computing device 90 and can include any device or group of devices suitable for establishing a wired or wireless data connection to one or more data networks. Non-limiting examples of the communication interface 95 include an Ethernet network adapter, a modem, and/or the like. The computing device 90 can transmit messages as electronic or optical signals via the communication interface 95. A bus 96 can also be included to communicatively couple one or more components of the computing device 90.

The computing device 90 can execute program code that configures the processor 91 to perform one or more of the operations described above. The program code can include one or more modules. The program code may be resident in the memory 92, storage 93, or any suitable computer-readable medium and may be executed by the processor 91 or any other suitable processor. In some embodiments, modules can be resident in the memory 92. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method, performed by a computing device, for displaying depth effects in digital artwork based on movement of a display, the method comprising:
    displaying a first rendering of the digital artwork on the display, the digital artwork including a reference plane and a displacement map, the displacement map indicating, for each pixel in the digital artwork, a depth from the reference plane, the displacement map defining a surface of the artwork above the reference plane;
    determining a movement of the display based on motion information from a motion sensor associated with the display;
    based on the movement of the display, determining a relative position of the digital artwork to a fixed gaze direction and a fixed light direction in a 3 dimensional (3D) model, the relative position defining a relative gaze direction;
    determining, for each pixel, a respective parallax offset based on a difference between intersection of the relative gaze direction with the displacement map and intersection of the relative gaze direction with the pixel on the reference plane of the digital artwork by:
        determining a position of the pixel on a virtual plane relative to the reference plane-for a straight-on gaze direction, the virtual plane being parallel to the reference plane, and
        determining a corresponding offset pixel for the pixel, the corresponding offset pixel being at an intersection of the relative gaze direction and the displacement map; and
    displaying a second rendering of the digital artwork on the display, wherein displaying the second rendering comprises displaying a depth effect based on the respective parallax offset of each pixel by displaying, for each pixel, a color value of the corresponding offset pixel at the position of the pixel on the virtual plane.

2. The method of claim 1, wherein displaying the depth effect comprises displaying shadow occlusions, wherein displaying the shadow occlusions comprises displaying shadows where deeper portions of the digital artwork block light to thinner portions on a surface of the digital artwork given the fixed light direction.

3. The method of claim 1, wherein the digital artwork is an impasto painting and the displacement map is based on variable paint thickness within the impasto painting.

4. The method of claim 1 further comprising:
    determining different positions of the digital artwork during the movement relative to the fixed gaze direction and the fixed light direction in the 3D model; and
    displaying, during the movement, a sequence of renderings of the digital artwork with depth effects based on the different positions of the digital artwork.

5. The method of claim 4, wherein displaying the sequence of rendering comprises displaying the digital artwork aligned with a surface of the display in the sequence of renderings.

6. The method of claim 1 further comprising determining the fixed gaze direction based on a default gaze direction that is perpendicular to a surface of the display.

7. The method of claim 1 further comprising:
    detecting a location of a viewer using a camera or sensor; and
    determining the fixed gaze direction based on the detected location of the viewer.

8. The method of claim 1 further comprising determining the fixed light direction based on a default light direction from a default light source in a predetermined position relative to the display.

9. The method of claim 1 further comprising:
    detecting a location of a light source using a camera or sensor; and
    determining the fixed light direction based on the detected location of the light source.

10. The method of claim 1, wherein determining the movement of the display comprises determining the movement of the display by detecting a rotation, tilt, or translation of the display using a gyroscope or accelerometer.

11. The method of claim 1, wherein determining the corresponding offset pixels includes:
    providing the virtual plane and the displacement map as a geometric primitive to a graphics processing unit.

12. A system comprising:
    memory storing a digital artwork in a 3 dimensional (3D) model, the digital artwork including a reference plane and a displacement map, the displacement map indicating, for each pixel in the digital artwork, a depth from the reference plane;
    a display;
    a means for determining movements of the display;

a means for determining a relative gaze direction based on the movements of the display;

means for determining, for each pixel and for a straight-on gaze direction, a position of the pixel on a virtual plane relative to the reference plane, the virtual plane being parallel to the reference lane;

a means for determining, for each pixel, an offset pixel on the reference plane based on the relative gaze direction and the displacement map, the offset pixel defining a respective parallax offset for the pixel; and a means for displaying the renderings of the digital artwork on the display based on the respective parallax offset of each pixel.

13. The system of claim 12 wherein the virtual plane is at the reference plane.

14. The system of claim 12, wherein the means for displaying the renderings of the digital artwork comprises a means for determining shadow occlusions for the renderings based on the positions of the digital artwork relative a fixed light direction.

15. The system of claim 14 further comprising a means for determining the fixed light direction based on a location of a light relative to the display.

16. The system of claim 12 further comprising a means for displaying a sequence of the renderings of the digital artwork during each of the movements.

17. The system of claim 12 wherein the virtual plane is above the reference plane.

18. A non-transitory computer-readable medium storing instructions, the instructions comprising instructions for:

displaying a digital artwork in a 3 dimensional (3D) model, the digital artwork including a reference layer and a displacement map, the displacement map indicating, for each pixel in the digital artwork, a depth from the reference layer;

determining a movement of the display;

based on the movement of the display, determining, a relative gaze direction;

representing the digital artwork as a virtual plane of pixels comprising pixel color values for a straight-on gaze direction;

determining, for each pixel, a respective parallax offset determined based on a difference between intersection of the relative gaze direction with the displacement map and intersection of the relative gaze direction with the pixel on the reference layer of the digital artwork, the parallax offset defining an offset pixel for the pixel, the offset pixel being a pixel in the virtual plane located at the respective parallax offset of the pixel; and displaying a rendering of the digital artwork on the display based on the respective parallax offsets by displaying, for each pixel in the virtual plane, a color value for the respective offset pixel.

19. The non-transitory computer-readable medium of claim 18, wherein displaying the rendering of the digital artwork further includes:

determining a position of the digital artwork relative to a fixed light direction in the 3D model;

determining shadow occlusions on the digital artwork based on the fixed light direction, wherein determining the shadow occlusions comprises determining where deeper portions of the digital artwork block light to thinner portions on a surface of the digital artwork; and displaying the digital artwork based on the shadow occlusions.

20. The non-transitory computer-readable medium of claim 18, wherein determining the offset pixel includes:

providing the virtual plane and the displacement map as a geometric primitive to a graphics processing unit.

* * * * *

UNITED STATES PATENT AND TRADEMARK OFFICE
CERTIFICATE OF CORRECTION

PATENT NO. : 10,290,146 B2
APPLICATION NO. : 15/335069
DATED : May 14, 2019
INVENTOR(S) : Chen et al.

Page 1 of 1

It is certified that error appears in the above-identified patent and that said Letters Patent is hereby corrected as shown below:

In the Claims

In Column 21, Claim 12, Line 6, delete "lane;" and insert --plane;--, therefor.

In Column 21, Claim 13, Line 14, delete "claim 12" and insert --claim 12,--, therefor.

In Column 21, Claim 17, Line 27, delete "claim 12" and insert --claim 12,--, therefor.

Signed and Sealed this
Tenth Day of September, 2019

Andrei Iancu
*Director of the United States Patent and Trademark Office*